US012499546B2

(12) United States Patent
Chang

(10) Patent No.: US 12,499,546 B2
(45) Date of Patent: Dec. 16, 2025

(54) APPARATUS AND METHOD USING DIFFERENT SCANNED AND PROCESSED INTRAORAL IMAGES TO IDENTIFY AND ADJUST TEETH BY COMPARING TOOTH NUMBERS

(71) Applicant: MEDIT CORP., Seoul (KR)

(72) Inventor: Min Ho Chang, Seoul (KR)

(73) Assignee: MEDIT CORP., Seoul (KR)

( * ) Notice: Subject to any disclaimer, the term of this patent is extended or adjusted under 35 U.S.C. 154(b) by 379 days.

(21) Appl. No.: 18/016,036

(22) PCT Filed: Jul. 9, 2021

(86) PCT No.: PCT/KR2021/008805
§ 371 (c)(1),
(2) Date: Jan. 13, 2023

(87) PCT Pub. No.: WO2022/014965
PCT Pub. Date: Jan. 20, 2022

(65) Prior Publication Data
US 2023/0274438 A1    Aug. 31, 2023

(30) Foreign Application Priority Data
Jul. 16, 2020  (KR) .................. 10-2020-0088463

(51) Int. Cl.
*G06T 7/00* (2017.01)
*A61C 7/00* (2006.01)
(Continued)

(52) U.S. Cl.
CPC ............ *G06T 7/0016* (2013.01); *A61C 7/002* (2013.01); *A61C 9/0053* (2013.01); *A61C 13/34* (2013.01);
(Continued)

(58) Field of Classification Search
None
See application file for complete search history.

(56) References Cited

U.S. PATENT DOCUMENTS 7,156,661 B2 *  1/2007  Choi ...................... A61C 7/002
                                                    433/213
2008/0305451 A1  12/2008  Kitching et al.
(Continued)

FOREIGN PATENT DOCUMENTS

KR       10-1099732 B1    12/2011
KR   10-2015-0048882 A     5/2015
(Continued)

OTHER PUBLICATIONS

Translation of Written Opinion from the KIPO for appl. No. 10-2020-0088463 dated Aug. 12, 2022 (Year: 2022).*
(Continued)

*Primary Examiner* — Scott A Rogers
(74) *Attorney, Agent, or Firm* — Sughrue Mion, PLLC

(57) ABSTRACT

Provided are an intraoral image processing apparatus and an intraoral image processing method. The intraoral image processing method includes obtaining a first intraoral image generated by scanning teeth and a second intraoral image generated by scanning the teeth with an orthodontic device attached thereto, segmenting teeth of the first intraoral image, obtaining a teeth image with the orthodontic device removed therefrom by replacing teeth with the orthodontic device attached thereto included in the second intraoral image with segmented teeth of the first intraoral image, and adjusting teeth of the teeth image by using numbers of teeth.

10 Claims, 14 Drawing Sheets

(51) Int. Cl.
*A61C 9/00* (2006.01)
*A61C 13/34* (2006.01)
*G06T 7/11* (2017.01)
*G06T 7/254* (2017.01)

(52) U.S. Cl.
CPC ............... *G06T 7/11* (2017.01); *G06T 7/254* (2017.01); *G06T 2207/20224* (2013.01); *G06T 2207/30036* (2013.01)

(56) References Cited

U.S. PATENT DOCUMENTS

| | | | |
|---|---|---|---|
| 2014/0067334 A1 | 3/2014 | Kuo | |
| 2019/0090982 A1* | 3/2019 | Kuo | ............... A61C 7/002 |
| 2019/0343601 A1 | 11/2019 | Roschin et al. | |
| 2023/0008836 A1* | 1/2023 | Yazykov | ............... G06T 7/0012 |
| 2023/0008883 A1* | 1/2023 | Romanov | ............ A61C 9/0046 |
| 2023/0142509 A1* | 5/2023 | Blankenbecler | ........ G06T 19/20 |
| | | | 433/24 |
| 2023/0225831 A1* | 7/2023 | Cramer | ................. G16H 20/40 |
| | | | 433/24 |
| 2023/0225832 A1* | 7/2023 | Cramer | ................. G16H 20/40 |
| | | | 433/2 |
| 2023/0298179 A1* | 9/2023 | Kang | ........................ G06T 7/73 |
| | | | 382/128 |
| 2023/0337898 A1* | 10/2023 | Lee | ..................... A61B 5/7264 |
| 2023/0372061 A1* | 11/2023 | Jung | ........................ A61C 7/12 |
| 2023/0394687 A1* | 12/2023 | Kim | ........................... G06T 7/75 |
| 2024/0177440 A1* | 5/2024 | Lee | ........................ A61B 18/20 |

FOREIGN PATENT DOCUMENTS

| | | |
|---|---|---|
| KR | 10-2056480 B1 | 12/2019 |
| KR | 10-2020-0016106 A | 2/2020 |
| KR | 20200016106 A * | 2/2020 |
| WO | WO2023018208 A1 * | 2/2023 |

OTHER PUBLICATIONS

International Search Report for PCT/KR2021/008805 dated Oct. 18, 2021 [PCT/ISA/210].
Written Decision on Registration for 10-2020-0088463 dated Nov. 17, 2022.
Request for the Submission of an Opinion for 10-2020-0088463 dated Nov. 12, 2021.
Request for the Submission of an Opinion for 10-2020-0088463 dated May 12, 2020.

* cited by examiner

APPARATUS AND METHOD USING DIFFERENT SCANNED AND PROCESSED INTRAORAL IMAGES TO IDENTIFY AND ADJUST TEETH BY COMPARING TOOTH NUMBERS

CROSS REFERENCE TO RELATED APPLICATIONS

This application is a National Stage of International Application No. PCT/KR2021/008805 filed Jul. 9, 2021, claiming priority based on Korean Patent Application No. 10-2020-0088463 filed Jul. 16, 2020.

TECHNICAL FIELD

Described embodiments relate to an intraoral image processing apparatus and an intraoral image processing method.

Particularly, described embodiments relate to an apparatus and method for processing an intraoral image obtained by scanning teeth with an orthodontic device for tooth correction attached thereto.

BACKGROUND ART

There are various fields in the dental treatment of patients. An orthodontic treatment (or a tooth correction) may be an example of the dental treatment.

In order to perform an orthodontic treatment, brackets may be installed on the patient's teeth and a wire may be connected to at least one installed bracket. The position of teeth may be corrected by moving at least one tooth to a desired position by using the brackets connected to the wire.

It may generally take a lot of time, for example, one year or more, to perform such an orthodontic treatment. During the orthodontic treatment period, the dentist should periodically examine whether the patient's teeth are being corrected to correspond to desired positions. Also, in consideration of the orthodontic progress, by using a wire, the dentist may adjust the interval between brackets such that the teeth may be moved to desired orthodontic positions.

Thus, there is a need to provide a method and apparatus for allowing the dentist to quickly and accurately detect the orthodontic progress while performing an orthodontic treatment.

DISCLOSURE

Technical Problem

Described embodiments provide an intraoral image processing method for allowing the user to intuitively detect the orthodontic progress and an apparatus for performing an operation according thereto.

Particularly, described embodiments provide an intraoral image processing method for allowing the user to quickly and easily detect the orthodontic progress by providing an intraoral image with an orthodontic device removed therefrom even during the orthodontic treatment period in which an orthodontic treatment is performed by attaching the orthodontic device to the patient's teeth and an apparatus for performing an operation according thereto.

Technical Solution

According to embodiments, an intraoral image processing method includes obtaining a first intraoral image generated by scanning teeth and a second intraoral image generated by scanning the teeth with an orthodontic device attached thereto, segmenting teeth of the first intraoral image, obtaining a teeth image with the orthodontic device removed therefrom by replacing teeth with the orthodontic device attached thereto included in the second intraoral image with segmented teeth of the first intraoral image, and adjusting teeth of the teeth image by using numbers of teeth.

Advantageous Effects

According to embodiments, the intraoral image processing method and the apparatus for performing an operation according thereto may allow the user to quickly and easily detect the orthodontic progress or the tooth movement by providing an intraoral image with an orthodontic device removed therefrom even while an orthodontic treatment is performed by attaching the orthodontic device to the user's teeth.

DESCRIPTION OF DRAWINGS

The present disclosure may be easily understood through the following detailed description and the accompanying drawings, in which reference numerals refer to structural elements.

BEST MODE

Figure 1:
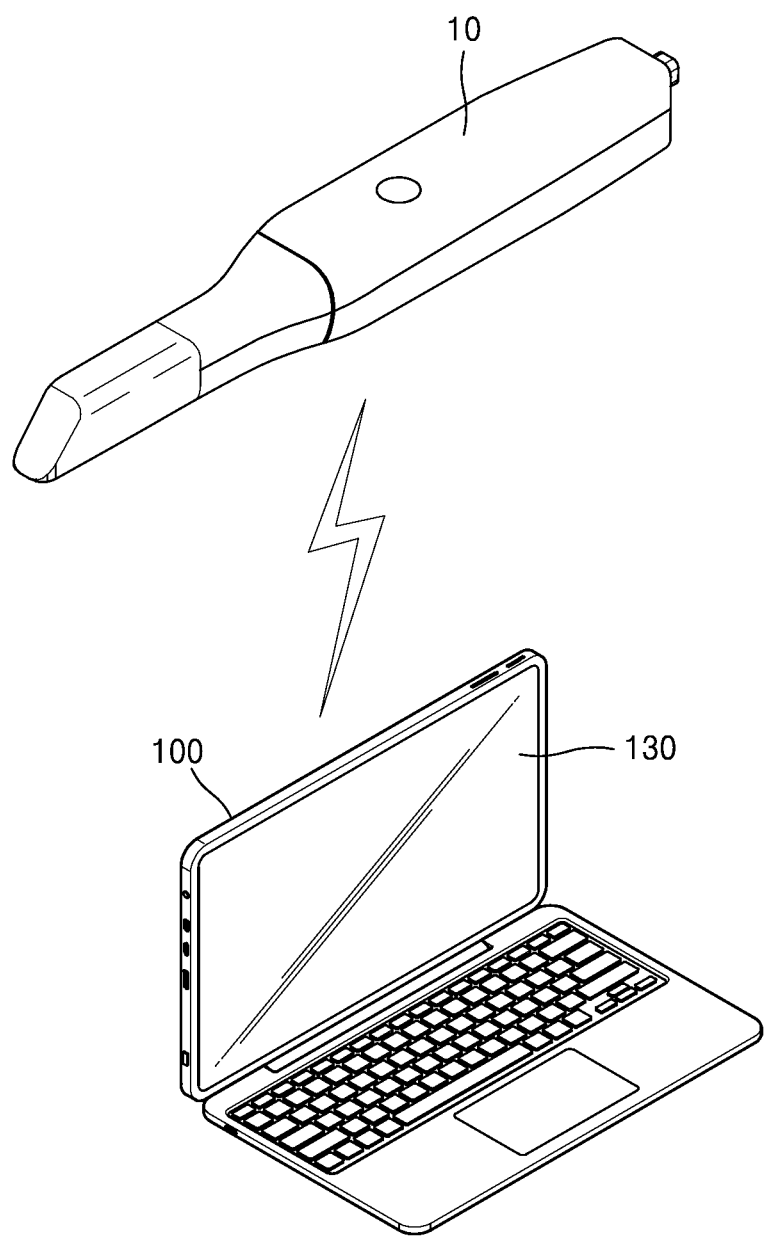
FIG. 1 is a diagram for describing an intraoral image processing system according to embodiments.

According to embodiments, an intraoral image processing method includes obtaining a first intraoral image generated by scanning teeth and a second intraoral image generated by scanning the teeth with an orthodontic device attached thereto, segmenting teeth of the first intraoral image, obtaining a teeth image with the orthodontic device removed therefrom by replacing teeth with the orthodontic device attached thereto included in the second intraoral image with segmented teeth of the first intraoral image, and adjusting teeth of the teeth image by using numbers of teeth.

According to an embodiment, the adjusting of the teeth of the teeth image may include identifying, by comparing tooth numbers of the first intraoral image with tooth numbers of the teeth image, at least one tooth of the teeth image that does not match a tooth number of the first intraoral image, and adjusting, with reference to the tooth numbers of the first intraoral image, a position of the at least one tooth of the teeth image that does not match the tooth number of the first intraoral image.

According to an embodiment, the tooth numbers of the first intraoral image may be obtained based on tooth model data with teeth numbered, and the tooth numbers of the teeth image may be obtained by replacing the teeth with the orthodontic device attached thereto included in the second intraoral image with the segmented teeth of the first intraoral image.

According to an embodiment, the adjusting of the teeth of the teeth image may include identifying, by comparing tooth model data with teeth numbered with tooth numbers of the teeth image, at least one tooth of the teeth image that does not match a tooth number of the tooth model data, and adjusting, with reference to tooth numbers of the tooth model data, a position of the at least one tooth of the teeth image that does not match the tooth number of the tooth model data.

According to an embodiment, the obtaining of the teeth image with the orthodontic device removed therefrom may include an operation performed by comparing shapes of the teeth with the orthodontic device attached thereto included in the second intraoral image with shapes of the segmented teeth of the first intraoral image.

According to an embodiment, an intraoral image processing apparatus includes a memory and a processor, wherein the processor is further configured to execute one or more instructions stored in the memory to obtain a first intraoral image generated by scanning teeth of a user and a second intraoral image generated by scanning the teeth of the user with an orthodontic device attached thereto, segment teeth of the first intraoral image, obtain a teeth image by replacing teeth with the orthodontic device attached thereto included in the second intraoral image with segmented teeth of the first intraoral image, and adjust teeth of the obtained teeth image by using numbers of teeth.

According to an embodiment, a non-transitory computer-readable storage medium has recorded therein a program including at least one instruction to perform an intraoral image processing method, the intraoral image processing method comprising obtaining a first intraoral image generated by scanning teeth of a user and a second intraoral image generated by scanning the teeth of the user with an orthodontic device attached thereto, segmenting teeth of the first intraoral image, obtaining a teeth image by replacing teeth with the orthodontic device attached thereto included in the second intraoral image with segmented teeth of the first intraoral image, and adjusting teeth of the obtained teeth image by using numbers of teeth.

MODE FOR INVENTION

The specification clarifies the scope of the present disclosure and describes the principle of the present disclosure and embodiments thereof such that those of ordinary skill in the art of the present disclosure may implement the present disclosure. The described embodiments may be implemented in various forms.

Throughout the specification, like reference numerals may denote like elements. The specification may not describe all elements of the embodiments, and redundant contents between the embodiments or general contents in the art of the present disclosure will be omitted for conciseness. The term "unit (part or portion)" used herein may be implemented as software or hardware, and according to embodiments, a plurality of "units" may be implemented as one element, or one "unit" may include a plurality of elements. Hereinafter, the operation principle and embodiments of the present disclosure will be described with reference to the accompanying drawings.

Herein, an image may include an image representing at least one tooth or an oral cavity including at least one tooth (hereinafter referred to as "intraoral image").

Also, herein, the image may be a two-dimensional (2D) image of an object or a three-dimensional (3D) model or a 3D image three-dimensionally representing an object. Also, herein, the image may refer to data required to represent an object in 2D or 3D, for example, raw data obtained from at least one image sensor. Particularly, the raw data may be data obtained to generate an intraoral image, and when the inside of the oral cavity of a patient as an object is scanned by using an intraoral scanner, the raw data may be data (e.g., 2D data) obtained from at least one image sensor included in the intraoral scanner.

Herein, the "object" may include teeth, gums, at least some areas of the oral cavity, and/or an artificial structure insertable into the oral cavity (e.g., an orthodontic device, implants, artificial teeth, or an orthodontic assistance tool inserted into the oral cavity). Here, the orthodontic device may include at least one of brackets, attachments, orthodontic screws, a lingual orthodontic device, and a removable orthodontic retainer.

Hereinafter, embodiments will be described in detail with reference to the accompanying drawings.

FIG. 1 is a diagram for describing an intraoral image processing system according to embodiments.

Referring to FIG. 1, an intraoral scanner 10 may be a medical device for obtaining an intraoral image.

Particularly, the intraoral scanner 10 may be a device for obtaining an image of the oral cavity including at least one tooth by scanning teeth in a non-contact manner by being inserted into the oral cavity. Also, the intraoral scanner 10 may have a form capable of being drawn into and from the oral cavity and may scan the inside of the patient's oral cavity by using at least one image sensor (e.g., an optical camera). In order to image the surface of at least one of teeth, gums, and an artificial structure insertable into the oral cavity as an object (e.g., an orthodontic device including brackets and wires, implants, artificial teeth, or an orthodontic assistance tool inserted into the oral cavity), the intraoral scanner 10 may obtain surface information of the object as raw data.

Image data obtained by the intraoral scanner 10 may be transmitted to a data processing apparatus 100 connected through a wired or wireless communication network.

The data processing apparatus 100 may any electronic device that may be connected to the intraoral scanner 10 through a wired or wireless communication network, may receive a 2D image obtained by scanning the oral cavity from the intraoral scanner 10, and may generate, process, display, and/or transmit an intraoral image based on the received 2D image.

Based on 2D image data received from the intraoral scanner 10, the data processing apparatus 100 may generate at least one of information generated by processing the 2D image and an intraoral image generated by processing the 2D image and display the generated information and the generated intraoral image through a display 130.

The data processing apparatus 100 may be, but is not limited to, a computing device such as a smartphone, a laptop computer, a desktop computer, a PDA, or a tablet PC.

Also, the data processing apparatus 100 may be provided in the form of, for example, a server (or a server device) for processing an intraoral image.

Also, the intraoral scanner 10 may transmit raw data obtained through intraoral scanning to the data processing apparatus 100 as it is. In this case, based on the received raw data, the data processing apparatus 100 may generate a 3D intraoral image three-dimensionally representing the oral cavity. Also, because the "3D intraoral image" may be generated by three-dimensionally modeling the internal structure of the oral cavity based on the received raw data, it may be referred to as a "3D intraoral model" or a "3D intraoral image". Hereinafter, a model or an image representing the oral cavity in 2D or 3D will be collectively referred to as an "intraoral image".

Also, the data processing apparatus 100 may analyze, process, display, and/or transmit the generated intraoral image to an external device.

As another example, the intraoral scanner 10 may obtain raw data through intraoral scanning, process the obtained raw data, generate an image corresponding to the oral cavity as an object, and transmit the image to the data processing apparatus 100. In this case, the data processing apparatus 100 may analyze, process, display, and/or transmit the received image.

In embodiments, the data processing apparatus 100 may be an electronic device that may generate and display an intraoral image three-dimensionally representing the oral cavity including at least one tooth with an orthodontic device attached thereto for tooth correction, which will be described below in detail.

Figure 2:
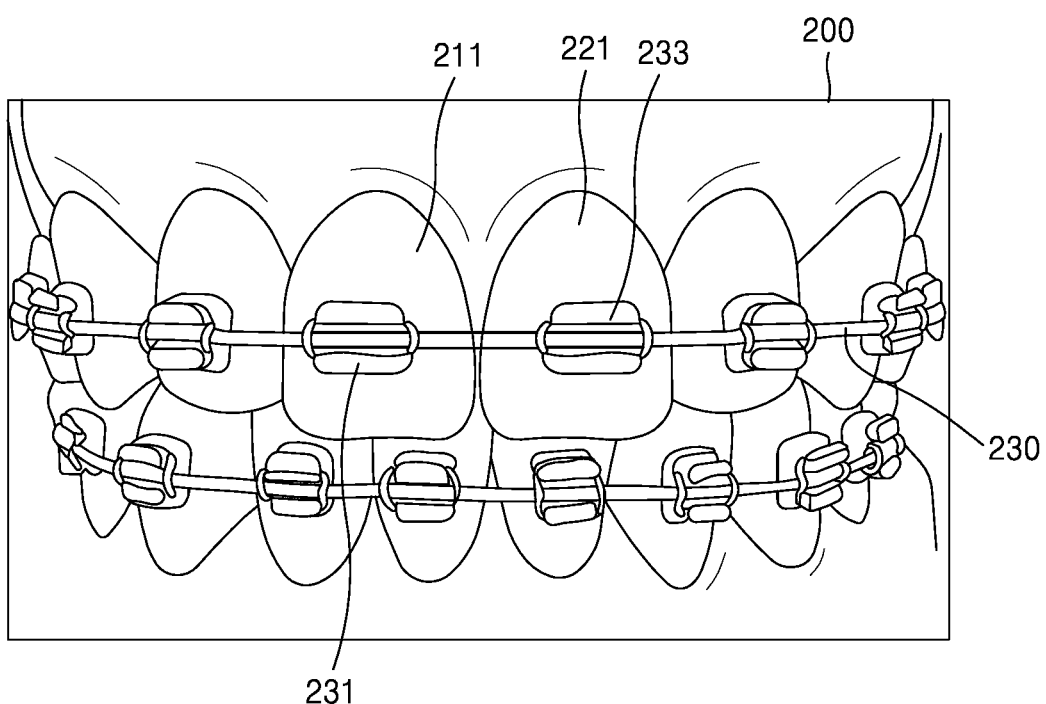
FIG. 2 is a diagram illustrating an intraoral image obtained by scanning at least one tooth with a bracket as a type of orthodontic device attached thereto, according to an example.

FIG. 2 is a diagram illustrating an intraoral image obtained by scanning at least one tooth with a bracket as a type of orthodontic device attached thereto, according to an example.

For example, teeth with brackets attached thereto may be scanned by using the intraoral scanner 10 described in FIG. 1. The data processing apparatus 100 may generate an intraoral image 200 representing the teeth with the brackets attached thereto, based on the data obtained by the intraoral scanner 10.

The intraoral scanner 10 may obtain only surface information of an object. In an embodiment, when the intraoral scanner 10 scans teeth with brackets attached thereto, information representing the surface of the teeth with the brackets attached thereto may be obtained as 2D data. The data processing apparatus 100 may generate an intraoral image 200 based on the 2D data obtained by the intraoral scanner 10.

As for the intraoral image 200, because the entire surface in the patient's oral cavity is imaged, all of an orthodontic device attached to teeth (e.g., 211 and 221), for example, brackets 231 and 233, a wire 230 connecting the brackets 231 and 233, and the like may be imaged together.

In the orthodontic treatment, the dentist should accurately detect the patient's orthodontic process or orthodontic history in order to accurately perform a future orthodontic treatment. However, in detecting the movement of the teeth with reference to the intraoral image 200, it may be difficult to clearly detect the movement of the teeth due to the brackets attached to the teeth.

Thus, in embodiments, by providing an intraoral image with an orthodontic device such as brackets removed therefrom even during the progress of an orthodontic treatment, it may be possible for the user such as the dentist or the patient to easily identify the orthodontic progress process or the tooth movement.

Figure 3:
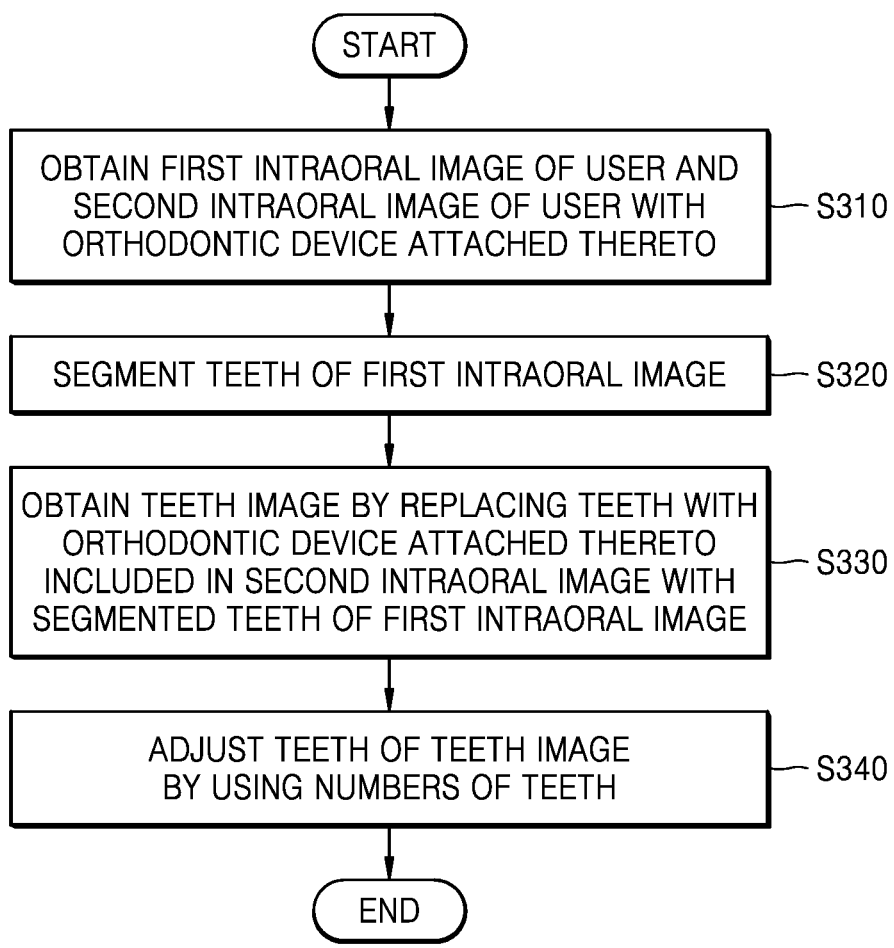
FIG. 3 is a flowchart illustrating an intraoral image processing method of a data processing apparatus according to embodiments.

FIG. 3 is a flowchart illustrating an intraoral image processing method of a data processing apparatus according to embodiments.

Referring to FIG. 3, in operation 310, the data processing apparatus 100 may obtain a first intraoral image of the user (for example, a patient) and a second intraoral image of the user with the orthodontic device attached thereto.

In embodiments, the first intraoral image of the user may represent data obtained by scanning the user's oral cavity before attaching the orthodontic device to the user's teeth. The second intraoral image may represent data obtained by scanning the user's teeth with the orthodontic device attached thereto. The first intraoral image may be data obtained at a first time point, and the second intraoral image may be data obtained by scanning the patient's oral cavity at a second time point subsequent to the first time point. Here, the first time point may be a certain time point, and the second time point may be a time point when a certain time, for example, one month or three months, has elapsed from the first time point.

Here, the first time point and the second time point may correspond to time points when the patient in the orthodontic treatment process visits the dentist to check the orthodontic process. For example, the second time point may be a current time point or a recent time point closest to the current point in the orthodontic treatment process. The first time point may be a time point before the second time point. As another example, the first time point and the second time point may be two different time points set by the user such as the dentist. For example, when the dentist wants to check the patient's past orthodontic history, the dentist may set two time points for checking as the first time point and the second time point. Particularly, the second time point may be a current time point, a recent time point close to the present, or a time point in the past. Also, the first time point may be any time point preceding the second time point.

In embodiments, the "orthodontic device" may refer to an artificial object attached onto the teeth to correct the position of the teeth. For example, the orthodontic device may include brackets, attachments, orthodontic screws, a lingual orthodontic device, and/or a removable (orthodontic) retainer. Also, the orthodontic device may be attached onto the teeth in a direct contact form, like brackets. Also, the orthodontic device may be attached to the teeth in a detachable form or in an indirect contact form, like a removable retainer. The orthodontic device may be attached to at least one of the front and rear surfaces of the teeth.

In the accompanying drawings and the following detailed description, a case where the orthodontic device is brackets will be illustrated and described as an example.

In operation 320, the data processing apparatus 100 may segment the teeth of the first intraoral image. Segmenting the teeth of the first intraoral image may mean separating the teeth included in the first intraoral image and obtaining information about each of the separated teeth and information about the tooth arrangement. The information about each tooth may include information about the shape of each tooth, information about the position of each tooth, and information about the number of each tooth.

In operation 330, the data processing apparatus 100 may obtain a teeth image by replacing the teeth with the orthodontic device attached thereto included in the second intraoral image with the segmented teeth of the first intraoral image.

In operation 340, the data processing apparatus 100 may adjust the teeth of the teeth image by using the numbers of the teeth.

In the process of performing an orthodontic treatment by attaching the orthodontic device to the teeth, a change in the position of the teeth with the orthodontic device attached thereto, that is, a tooth movement, may occur as the orthodontic treatment progresses with the lapse of time. In describing embodiments, the "tooth movement" may refer to a difference in the position of the teeth occurring between a plurality of different time points (e.g., the first time point and the second time point), a change in the position of the teeth occurring between a plurality of different time points (e.g., the first time point and the second time point), or a movement of the teeth occurring between a plurality of different time points (e.g., the first time point and the second time point).

Also, the intraoral image processing method according to embodiments may further include an operation of displaying the teeth image with the position of the teeth adjusted, which has been generated in operation 340. Alternatively, the intraoral image processing method according to embodiments may further include an operation of transmitting the teeth image generated in operation 340 to an external device (e.g., the dentist's computing device).

The intraoral image processing method according to embodiments will be described below in detail with reference to FIGS. 4 to 14.

Figure 4:
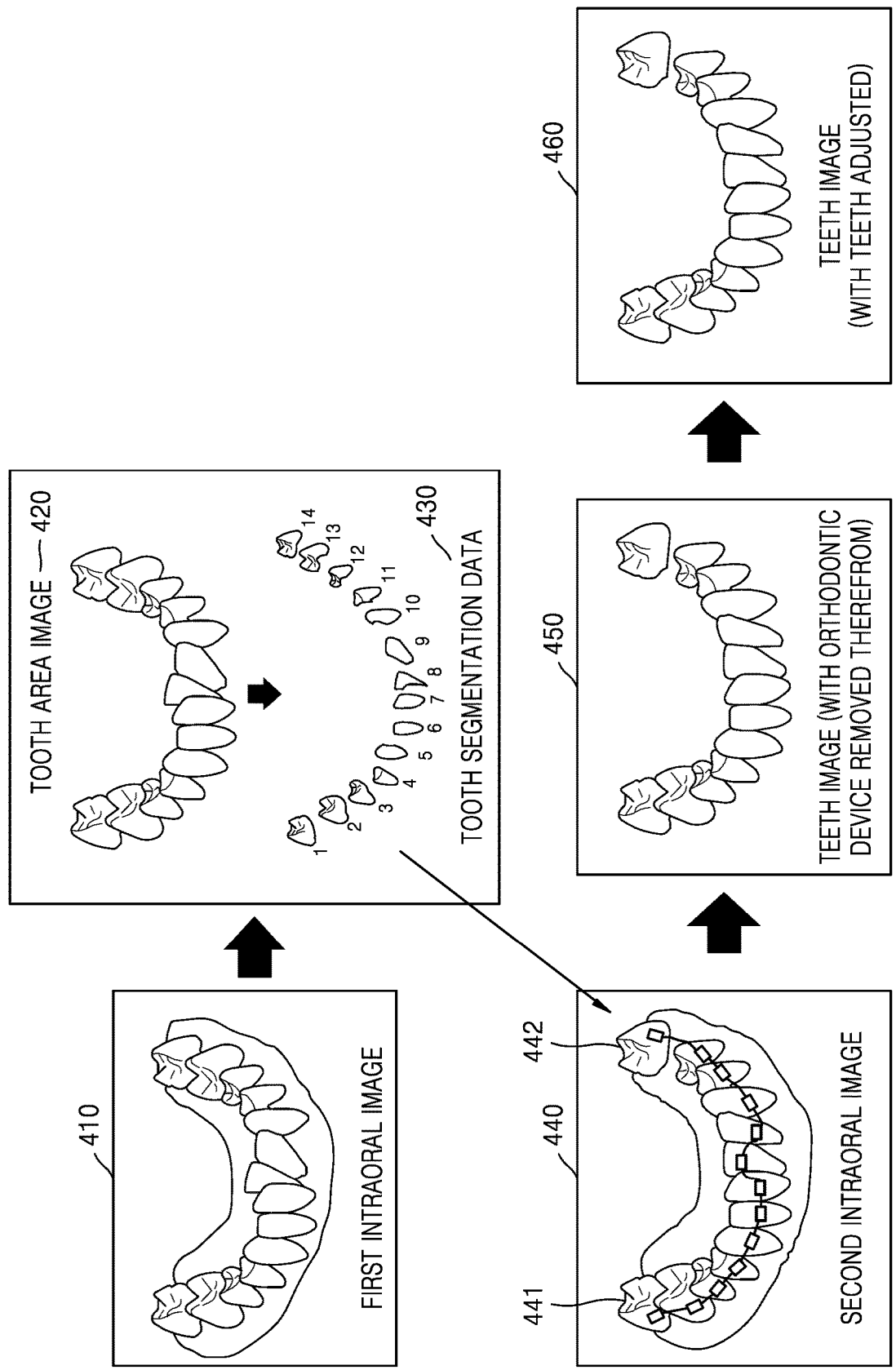
FIG. 4 is a reference diagram for describing an intraoral image processing method according to an embodiment.

FIG. 4 is a reference diagram for describing an intraoral image processing method according to an embodiment.

Referring to FIG. 4, a first intraoral image 410 may be data obtained by scanning the user's oral cavity before the orthodontic device is attached to the user's teeth.

The data processing apparatus 100 may obtain a tooth area image 420 by separating a tooth area from the first intraoral image 410 and then obtain tooth segmentation data 430 by segmenting the teeth of the tooth area image 420 by using tooth model data.

The data processing apparatus 100 may obtain a second intraoral image by scanning the oral cavity with the orthodontic device attached to the user's teeth at a certain time point after the obtaining of the first intraoral image. Because the second intraoral image is obtained at a time point when a certain time elapses after the obtaining of the first intraoral image, the position of the teeth in the second intraoral image may be different from the position of the teeth in the first intraoral image.

The second intraoral image may be displayed to show the patient as the user how much the teeth have been moved by the orthodontic device; however, because the second intraoral image represents a state where the orthodontic device has been attached to the user's teeth and thus it may be difficult to identify how much the teeth have moved in the second intraoral image compared to the original teeth, that is, the teeth of the first intraoral image, it may be desirable to show the teeth with the orthodontic device removed therefrom in the second intraoral image, according to an embodiment.

In order to remove the orthodontic device attached to the teeth in the second intraoral image, the data processing apparatus 100 may use the tooth segmentation data obtained from the first intraoral image. That is, the data processing apparatus 100 may search the tooth segmentation data 430 for a tooth having a shape similar to the shape of each tooth included in the second intraoral image and substitute the found tooth for the corresponding tooth position of the second intraoral image, thereby replacing the teeth with the orthodontic device attached thereto in the second intraoral image by the teeth with the orthodontic device removed therefrom. For example, in order to replace the tooth located at the first left in the second intraoral image, the data processing apparatus 100 may search the tooth segmentation data 430 for a tooth having a similar shape thereto and, when it is determined as a result of the search that tooth data #1 is similar thereto, substitute tooth data #1 for the tooth position located at the first left in the second intraoral image 440. As such, a teeth image 450 with the orthodontic device removed therefrom may be obtained by searching the tooth segmentation data for teeth respectively having similar shapes to all the teeth of the second intraoral image 440 and then arranging similar tooth data at the corresponding positions of the second intraoral image 440. By obtaining the teeth image 450 as such, the patient as the user may be provided with an image of a tooth arrangement state having the same tooth arrangement as the second intraoral image, but with the orthodontic device removed therefrom.

By the way, in obtaining the teeth image, the shape of each tooth included in the second intraoral image is compared with the tooth shape of the tooth segmentation data to find and substitute a similar tooth shape; however, in this case, incorrect tooth data may be selected and substituted because one or more teeth may have a similar shape. For example, because tooth data #1 and tooth data #14 corresponding to molars have a similar shape, the data processing apparatus 100 may incorrectly substitute tooth data #1 for a right molar position 442 in the second intraoral image and tooth data #14 for a left molar position 441 in the second intraoral image. Thus, as a result, in the teeth image 450, the left molar and the right molar may be arranged at incorrect positions with each other. In order to prevent such an error, the data processing apparatus may identify an incorrect tooth number by again comparing the tooth numbers of the teeth arranged in the teeth image with the tooth numbers of the tooth segmentation data 430. Thereafter, when an incorrect tooth number is identified in the teeth image, the data processing apparatus 100 may obtain an adjusted teeth image 460 by adjusting the teeth of the teeth image by changing and arranging the positions of the teeth such that the tooth numbers may be corrected or adjusted.

Figure 5:
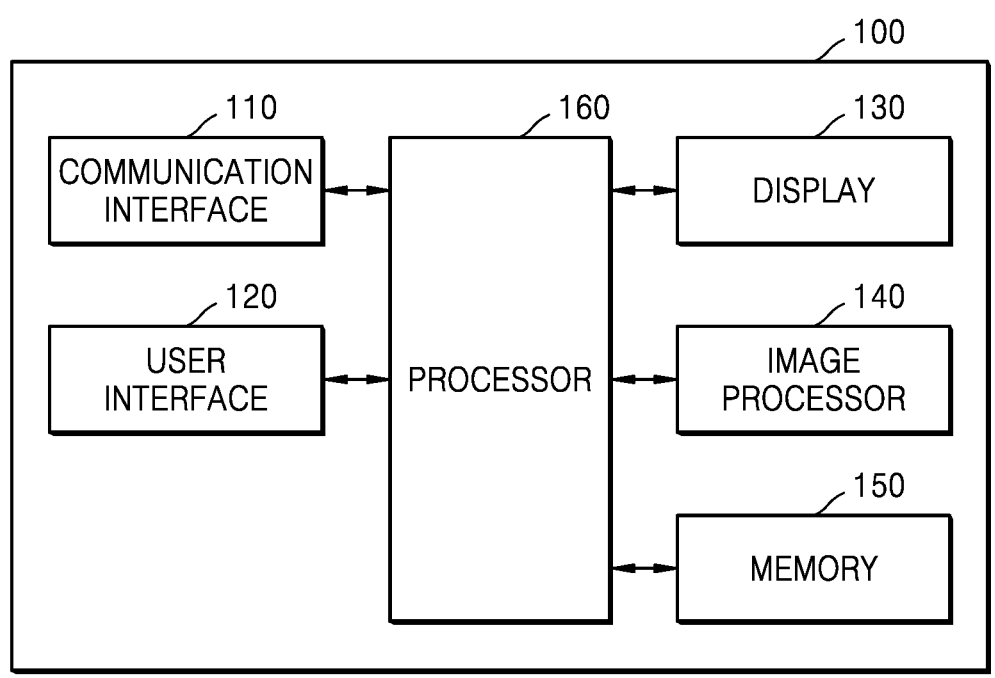
FIG. 5 is a block diagram illustrating a data processing apparatus according to embodiments.

FIG. 5 is a block diagram illustrating a data processing apparatus according to embodiments.

The intraoral image processing method illustrated in FIG. 3 may be performed through the data processing apparatus 100. Thus, the intraoral image processing method illustrated in FIG. 3 may correspond to a flowchart illustrating the operations of the data processing apparatus 100.

Referring to FIG. 5, the data processing apparatus 100 may include a communication interface 110, a user interface 120, a display 130, an image processor 140, a memory 150, and a processor 160.

The communication interface 110 may perform communication with at least one external electronic device through a wired or wireless communication network. Particularly, the communication interface 110 may communicate with the intraoral scanner 10 under the control by the processor 160. The communication interface 110 may perform communication with an external electronic device or a server connected through a wired/wireless communication network under the control by the processor.

The communication interface 110 may communicate with an external electronic device (e.g., an intraoral scanner, a server, or an external medical device) through a wired or wireless communication network. Particularly, the communication interface may include at least one short-range communication module performing communication according to the communication standard such as Bluetooth, Wi-Fi, Bluetooth Low Energy (BLE), NFC/RFID, Wi-Fi Direct, UWB, or ZigBee.

Also, the communication interface 110 may further include a long-range communication module performing communication with a server for supporting long-range communication according to the long-range communication standard. Particularly, the communication interface 110 may include a long-range communication module performing communication through a network for Internet communication. Also, the communication interface may include a long-range communication module performing communication through a communication network conforming to the communication standard such as 3G, 4G, and/or 5G.

Also, in order to communicate by wire with an external electronic device (e.g., an intraoral scanner), the communication interface 110 may include at least one port for being connected to the external electronic device through a wired cable. Accordingly, the communication interface 110 may perform communication with the external electronic device connected by wire through the at least one port.

The user interface 120 may receive a user input for controlling the data processing apparatus. The user interface 120 may include, but is not limited to, a user input device including a touch panel for sensing a user's touch, a button for receiving a user's push operation, and/or a mouse or a keyboard for designating or selecting a point on a user interface screen.

Also, the user interface 120 may include a voice recognition device for voice recognition. For example, the voice recognition device may be a microphone, and the voice recognition device may receive a user's voice command or voice request. Accordingly, the processor may control an operation corresponding to the voice command or voice request to be performed.

The display 130 may display a screen. Particularly, the display 130 may display a certain screen under the control by the processor 160. Particularly, the display 130 may display a user interface screen including the intraoral image generated based on the data obtained by scanning the patient's oral cavity by the intraoral scanner 10. Alternatively, the display 130 may display a user interface screen including information related to the patient's dental treatment.

The image processor 140 may perform operations for generating and/or processing an image. Particularly, the image processor 140 may receive the raw data obtained from the intraoral scanner 10 and generate an intraoral image based on the received data. Particularly, the image processor 140 may generate a first intraoral image and a second intraoral image respectively corresponding to the first time point and the second time point. Alternatively, the image processor 140 may generate a plurality of intraoral images respectively corresponding to a plurality of time points with certain intervals therebetween.

The memory 150 may store at least one instruction. Also, the memory 150 may store at least one instruction executed by the processor. Also, the memory 160 may store at least one program executed by the processor 160. Also, the memory 150 may store data received from the intraoral scanner (e.g., raw data obtained through intraoral scanning). Alternatively, the memory may store an intraoral image three-dimensionally representing the oral cavity.

According to an embodiment, the memory 150 may include one or more instructions for performing an operation of obtaining a first intraoral image generated by scanning the teeth and a second intraoral image generated by scanning the teeth with the orthodontic device attached thereto, an operation of segmenting the teeth of the first intraoral image, an operation of obtaining a teeth image with the orthodontic device removed therefrom by replacing the teeth with the orthodontic device attached thereto included in the second intraoral image with the segmented teeth of the first intraoral image, and an operation of adjusting the teeth of the teeth image by using the numbers of the teeth.

According to an embodiment, the memory 150 may include one or more instructions for performing an operation performed by the data processing apparatus described herein to obtain the teeth image with the orthodontic device removed therefrom.

The processor 160 may execute at least one instruction to perform control such that a desired operation may be performed. Here, the at least one instruction may be stored in an internal memory included in the processor 160 or in the memory 150 included in the data processing apparatus separately from the processor.

Particularly, the processor 160 may execute at least one instruction to control at least one component included in the data processing apparatus such that a desired operation may be performed. Thus, although a case where the processor performs certain operations is described as an example, it may mean that the processor controls at least one component included in the data processing apparatus such that certain operations may be performed.

The processor 160 may perform an operation of obtaining a teeth image with the orthodontic device removed therefrom, which is described herein, by executing one or more instructions stored in the memory 150.

According to an example, the processor 160 may internally include at least one internal processor and a memory device (e.g., RAM or ROM) for storing at least one of programs, instructions, signals, and data to be processed or used by the internal processor.

Also, the processor 160 may include a graphic processor (graphic processing unit) for graphic processing corresponding to video. Also, the processor may be implemented as a System-on-Chip (SoC) including a combination of a core and a GPU. Also, the processor may include a single core or a multi-core. For example, the processor may include a dual core, a triple core, a quad core, a hexa core, an octa core, a deca core, a dodeca core, a hexadecimal core, and/or the like.

In embodiments, the processor 160 may generate an intraoral image based on the 2D image received from the intraoral scanner 10.

Particularly, under the control by the processor 160, the communication interface 110 may receive the data obtained by the intraoral scanner 10, for example, the raw data obtained through intraoral scanning. Based on the raw data received by the communication interface, the processor 160 may generate a 3D intraoral image three-dimensionally representing the oral cavity. For example, in order to restore a 3D image according to an optical triangulation method, the intraoral scanner may include an L camera corresponding to the left field of view and an R camera corresponding to the right field of view. The intraoral scanner may obtain L image data corresponding to the left field of view and R image data corresponding to the right field of view from the L camera and the R camera, respectively. Subsequently, the intraoral scanner may transmit raw data including the L image data and the R image data to the communication interface of the data processing apparatus 100.

Then, the communication interface 110 may transmit the received raw data to the processor, and the processor may generate an intraoral image three-dimensionally representing the oral cavity based on the received raw data.

Also, the processor 160 may control the communication interface to directly receive an intraoral image three-dimensionally representing the oral cavity from an external server, a medical device, or the like. In this case, the processor may obtain a 3D intraoral image without generating a 3D intraoral image based on the raw data. Particularly, the processor may obtain a plurality of 3D intraoral images respectively corresponding to a plurality of different time points.

According to embodiments, the processor 160 performing operations such as "extracting", "obtaining", and "generating" may include not only the processor 160 executing at least one instruction to directly perform the above operations but also the processor 160 controlling other components to perform the above operations.

In order to implement the embodiments disclosed herein, the data processing apparatus 100 may include only some of the components illustrated in FIG. 5 or may include more components than the components illustrated in FIG. 5.

Also, the data processing apparatus 100 may store and execute dedicated software linked to the intraoral scanner. Here, the dedicated software may also be referred to as a dedicated program, a dedicated tool, or a dedicated application. When the data processing apparatus 100 100 operates in conjunction with the intraoral scanner 10, the dedicated software stored in the data processing apparatus 100 100 may be connected to the intraoral scanner 10 to receive the data obtained through intraoral scanning in real time. For example, there is dedicated software for processing data obtained through intraoral scanning by the i500 product as the Medit intraoral scanner. Particularly, Medit produces and distributes "Medit Link" as software for processing, managing, using, and/or transmitting data obtained by the intraoral scanner (e.g., i500). Here, because the "dedicated software" refers to a program, a tool, or an application operable in conjunction with the intraoral scanner, various intraoral scanners developed and sold by various manufacturers may be used in common. Also, the above dedicated software may be produced and distributed separately from the intraoral scanner for performing intraoral scanning.

The data processing apparatus 100 may store and execute dedicated software corresponding to the i500 product. The dedicated software may perform one or more operations for obtaining, processing, storing, and/or transmitting the intraoral image. Here, the dedicated software may be stored in the processor. Also, the dedicated software may provide a user interface for using the data obtained by the intraoral scanner. Here, the user interface screen provided by the dedicated software may include the intraoral image generated according to embodiments.

Figure 6:
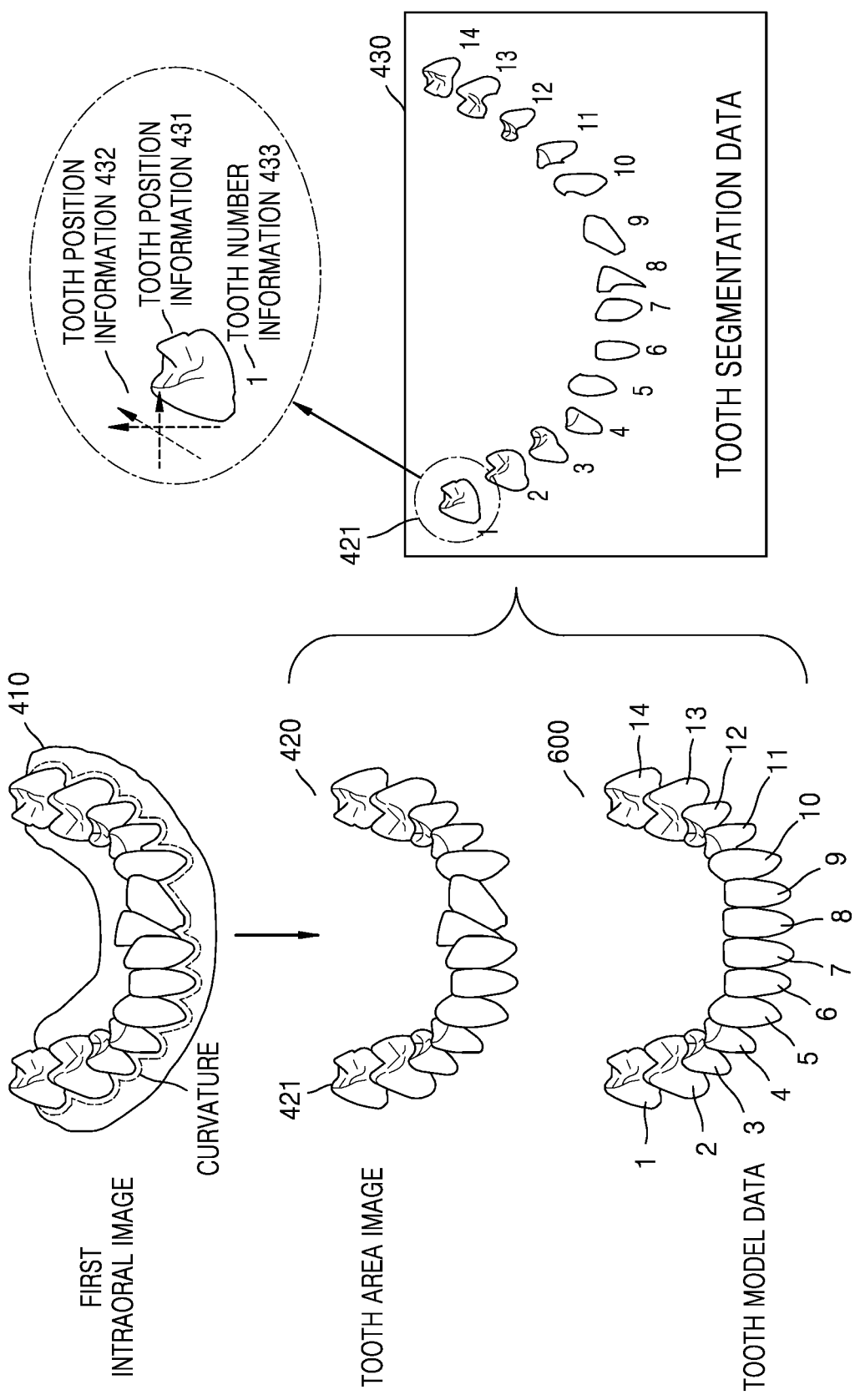
FIG. 6 is a reference diagram for describing a method of segmenting a first intraoral image by using tooth model data, according to an embodiment.

FIG. 6 is a reference diagram for describing a method of segmenting a first intraoral image by using tooth model data, according to an embodiment.

The first intraoral image 410 may represent an image obtained by scanning the oral cavity before the orthodontic device is attached to the user's teeth.

Tooth model data 600 may represent 3D tooth model data representing the most ideal dentition. The tooth model data 600 may be tooth data in which each tooth has an ideal shape and which has an ideal arrangement state of the teeth, and a tooth number may be given to each tooth of the tooth model data 600. The tooth model data 600 may include shape data about each tooth, position data about each tooth, and a tooth number of each tooth. Referring to FIG. 6, the tooth model data 600 may include 14 teeth, and the 14 teeth may be respectively given #1 to #14 sequentially from the left molar.

The data processing apparatus may obtain the tooth area image 420 by separating the tooth area by separating the teeth and the gums in the first intraoral image based on the curvature thereof. The data processing apparatus may assign a number to each tooth of the tooth area image 420 by aligning the tooth model data 600 with the tooth area image 420. When the data processing apparatus 100 aligns the tooth model data 600 with the tooth area image 420, the data processing apparatus 100 may use various alignment algorithms and may use, for example, a known iterative closest point (ICP) algorithm. The ICP algorithm may be an algorithm for minimizing the difference between two point clouds and may be an algorithm used to reconstruct a 2D or 3D surface from different scan data. The ICP algorithm may fix a point cloud referred to as a reference and transform a point cloud referred to as a source to best match the reference. The ICP algorithm may align the 3D model by repeatedly modifying a transformation (a combination of translation and rotation) necessary to minimize the error metric representing the distance from the source to the reference. In addition to the ICP algorithm, various other algorithms, for example, the Kabsch algorithm, may be used as the alignment algorithm.

When the data processing apparatus 100 uses the ICP algorithm to align the tooth model data 600 with the tooth area image 420 extracted from the first intraoral image, a point cloud corresponding to the tooth area image 420 may be a reference and a point cloud corresponding to the tooth model data may be a source.

As a result of searching the tooth model data 600 for the tooth having the closest shape to a tooth 421 that is the first tooth in the tooth area image 420, the data processing apparatus 100 may determine that the tooth corresponding to a tooth number 1 of the tooth model data 600 is the tooth having the closest shape to the tooth 421 of the tooth area image 420. As such, the tooth number may be obtained by searching the tooth model data 600 for the tooth closest to each tooth of the tooth area image 420.

As such, the data processing apparatus may obtain the tooth segmentation data 430 including information about each tooth by segmenting the tooth area image 420 extracted from the first intraoral image by using the tooth model data 600. The tooth segmentation data 430 may include tooth shape information 431, tooth position information 432, and tooth number information 433 of each tooth included in the tooth area image 420.

Figure 7:
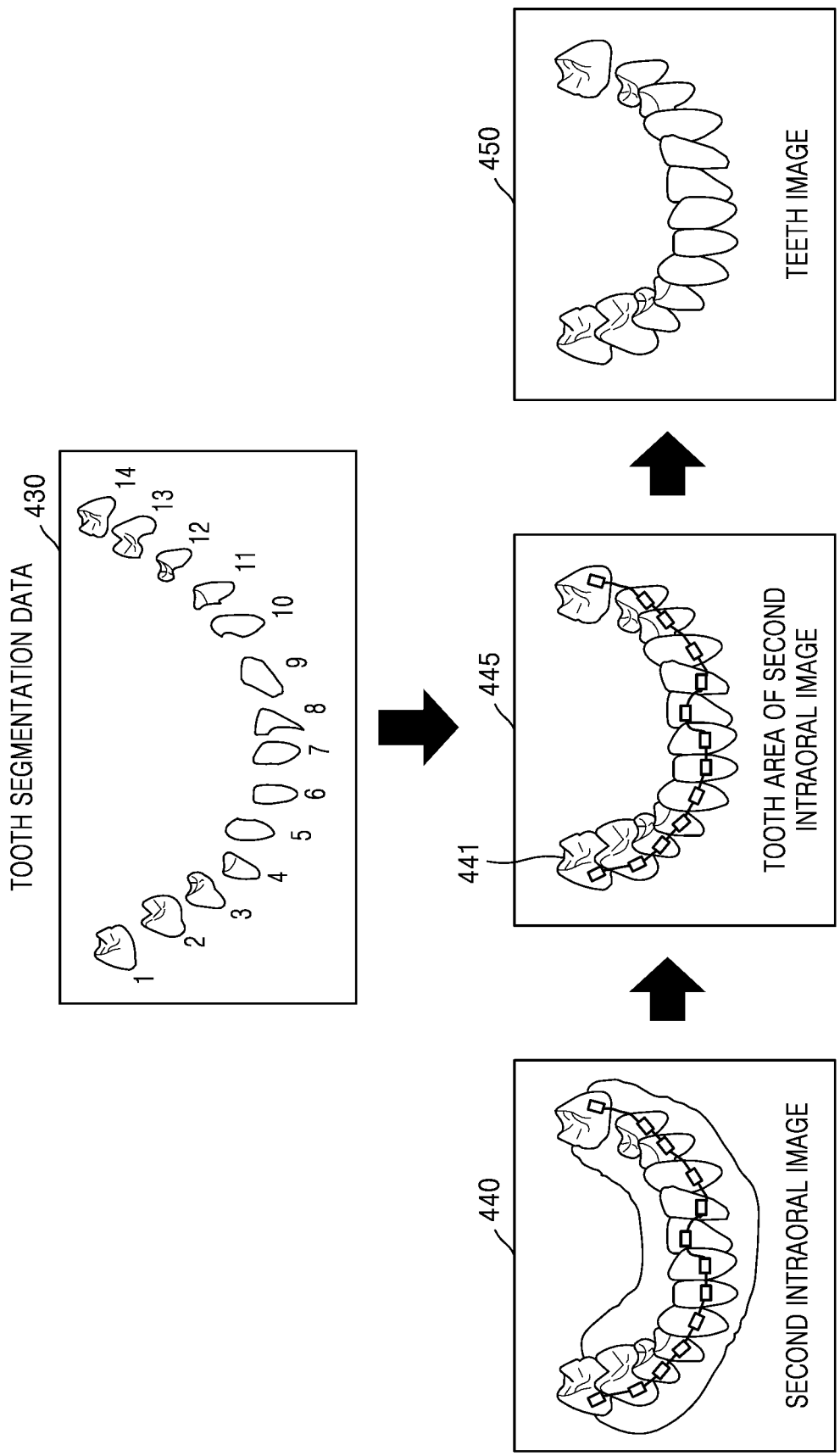
FIG. 7 is a reference diagram for describing a method of obtaining a teeth image with an orthodontic device removed therefrom from a second intraoral image by using tooth segmentation data, according to an embodiment.

FIG. 7 is a reference diagram for describing a method of obtaining a teeth image with an orthodontic device removed therefrom from a second intraoral image by using tooth segmentation data, according to an embodiment.

Referring to FIG. 7, the second intraoral image 440 may refer to an intraoral image obtained by scanning the oral cavity with the orthodontic device attached to the user's teeth at a certain time point after obtaining the first intraoral image. For example, the patient as the user may visit the hospital at certain periods after attaching the orthodontic device for the first time to identify how much the teeth have been moved by the orthodontic device. Thus, the second intraoral image may be data obtained by scanning the user's oral cavity at certain periods, for example, one month after the first intraoral image is obtained. The data processing apparatus 100 may separate a tooth area 445 by separating the teeth and the gums in the second intraoral image 440 based on the curvature thereof. The tooth having the closest shape to the teeth included in the tooth area 445 of the second intraoral image may be found in the tooth segmentation data 430. The data processing apparatus 100 may locate the closest tooth segmentation data at a corresponding tooth position in the tooth area 445 of the second intraoral image. For example, the data processing apparatus may search the tooth segmentation data 430 for the tooth similar to a tooth 441 located at the leftmost position of the tooth area 445 of the second intraoral image. For example, when the data processing apparatus determines that the tooth closest to the tooth 441 corresponds to a tooth number 1 of the tooth segmentation data 430, the data processing apparatus 100 may obtain a teeth image corresponding to the tooth 441 with the orthodontic device removed therefrom by replacing the tooth 441 of the tooth area 445 of the second intraoral image by using the tooth corresponding to the tooth number 1. As such, the teeth image 450 with the orthodontic device removed therefrom may be obtained by replacing all the teeth of the second intraoral image with the tooth segments of the tooth segmentation data 430. As such, the data processing apparatus 100 may obtain a teeth image having the same position as the teeth of the second intraoral image but with the orthodontic device removed therefrom, thereby providing an intraoral image that allows the user to easily detect the position state of the teeth without the orthodontic device interfering with the user's view.

Figure 8:
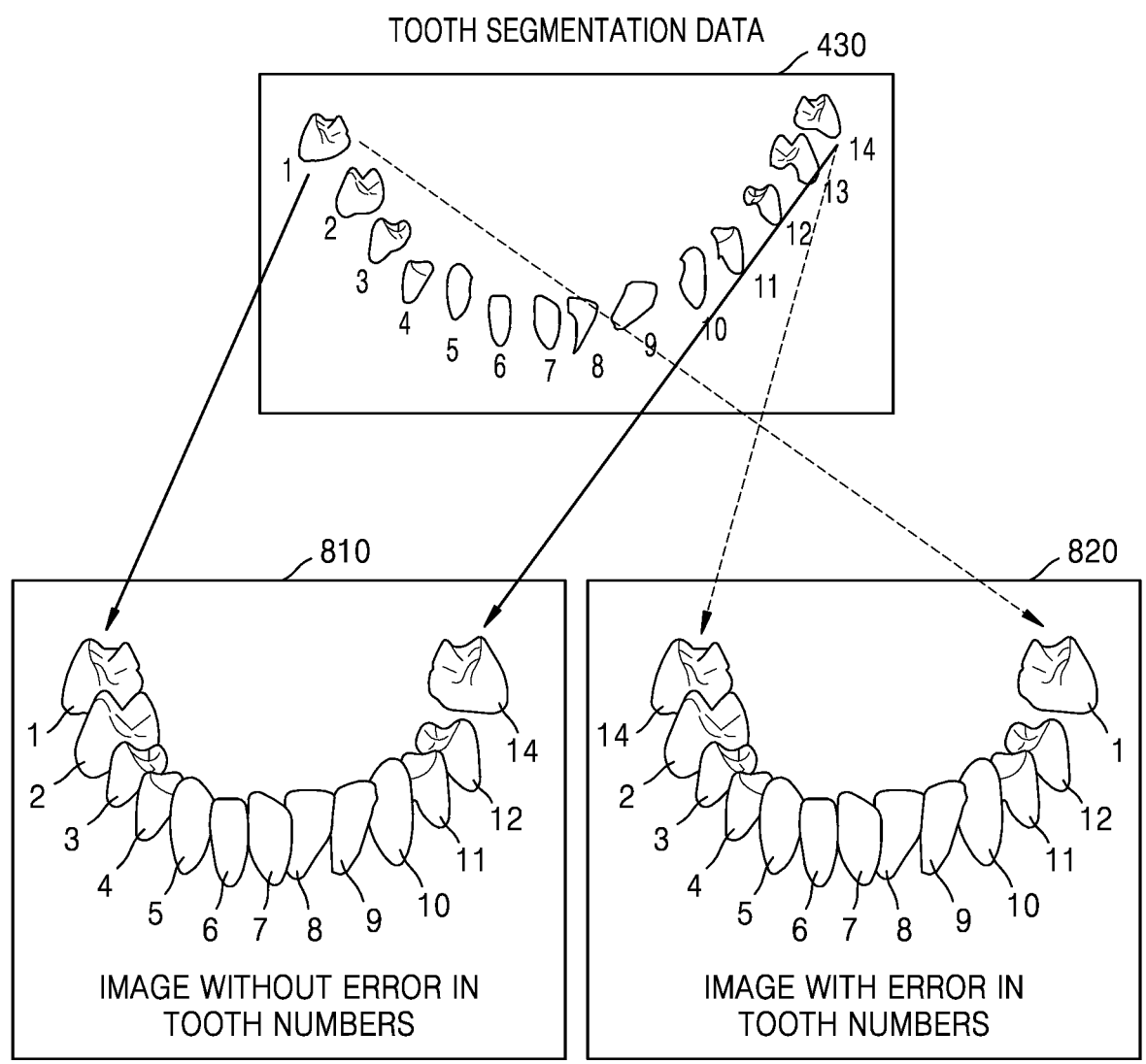
FIG. 8 is a reference diagram for describing a situation that may occur when a teeth image is obtained by using tooth segmentation data, according to an example.

FIG. 8 is a reference diagram for describing a situation that may occur when a teeth image is obtained by using tooth segmentation data, according to an example.

Referring to FIG. 8, when a teeth image is obtained by using the tooth segmentation data according to the method described with reference to FIG. 7, an image 810 without an error in the tooth numbers may be obtained but an image 820 with an error in the tooth numbers may be obtained.

When the operation is performed without an error, tooth segment #1 to tooth segment #14 of the tooth segmentation data 430 may be sequentially arranged from the leftmost position of the second intraoral image and thus the image 810 without an error in the tooth numbers may be obtained. However, while the data processing apparatus 100 searches the tooth segmentation data 430 for the tooth segment closest to the teeth of the second intraoral image and substitutes the found tooth segment, for example, when there are a plurality of tooth segments having a similar shape among the tooth segments included in the tooth segmentation data 430, the data processing apparatus 100 may locate an incorrect tooth segment of the tooth segmentation data 430 at a tooth position of the second intraoral image. For example, because the leftmost molar and the rightmost molar are highly likely to have a similar shape, the data processing apparatus 100 may substitute the tooth segment corresponding to tooth number #1 of the tooth segmentation data 430 for the rightmost tooth position of the second intraoral image and substitute the tooth segment corresponding to tooth number #14 of the tooth segmentation data 430 for the leftmost tooth position of the second intraoral image and thus it may be likely to obtain the image 820 with an error in the tooth numbers. As such, when the image 820 with an error in the tooth numbers is obtained, the data processing apparatus 100 may need to correct such an error.

Figure 9:
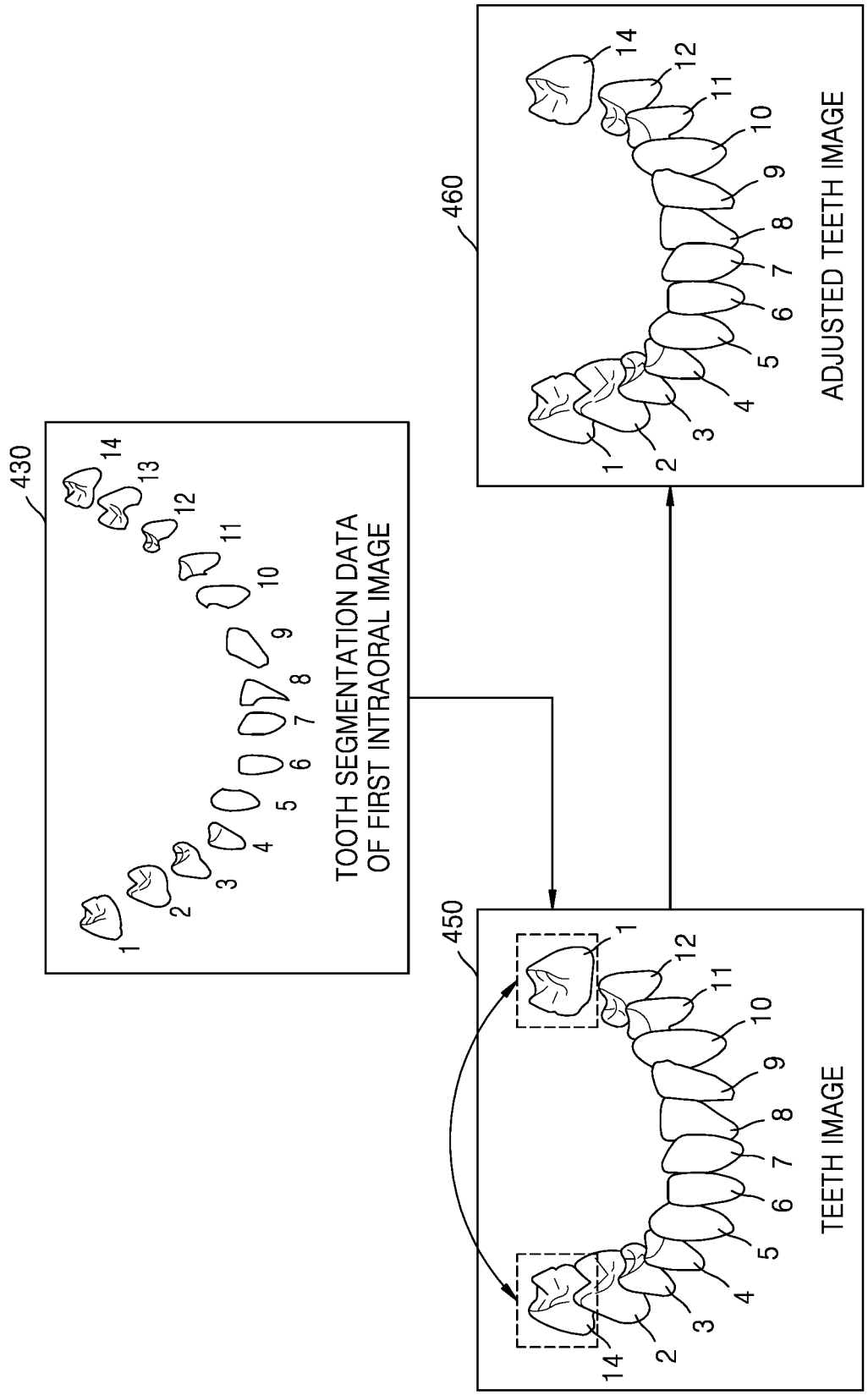
FIG. 9 is a reference diagram for describing a method of adjusting the tooth position of a teeth image by using tooth segmentation data of a first intraoral image, according to an embodiment.

FIG. 9 is a reference diagram for describing a method of adjusting the tooth position of a teeth image by using tooth segmentation data of a first intraoral image, according to an embodiment.

Referring to FIG. 9, the data processing apparatus 100 may determine whether it is necessary to adjust the teeth of the teeth image 450, by comparing the teeth image 450 obtained according to the method described with reference to FIG. 7 with the tooth segmentation data 430 of the first intraoral image. Particularly, the data processing apparatus 100 may determine whether there is an error in the tooth numbers, by comparing the tooth numbers of the teeth of the teeth image 450 with the tooth numbers of the teeth of the tooth segmentation data of the first intraoral image.

In the tooth segmentation data 430 of the first intraoral image, the teeth may be respectively numbered with tooth numbers sequentially increasing by 1 from the left starting with tooth number #1, that is, tooth number #1 given to the leftmost tooth, tooth number #2 given to the next tooth, . . . , and tooth number #14 given to the rightmost tooth, and each tooth given each tooth number may have tooth position information.

In the teeth image 450 obtained by the data processing apparatus 100 through tooth replacement, tooth number #14 may be given to the leftmost tooth and tooth number #1 may be given to the rightmost tooth. Thus, the data processing apparatus 100 may identify that the tooth numbers of the teeth of the teeth image do not match the tooth numbers of the tooth segmentation data 430 of the first intraoral image.

The data processing apparatus 100 may identify the portions where the tooth numbers of the teeth of the teeth image do not match the tooth numbers of the tooth area image of the first intraoral image, and adjust the identified portions where the tooth numbers do not match the corresponding tooth numbers. For example, the data processing apparatus 100 may obtain an adjusted teeth image 460 by adjusting incorrect tooth positions by interchanging the tooth given tooth number #1 with the tooth given tooth number #14 in the teeth image.

Figure 10:
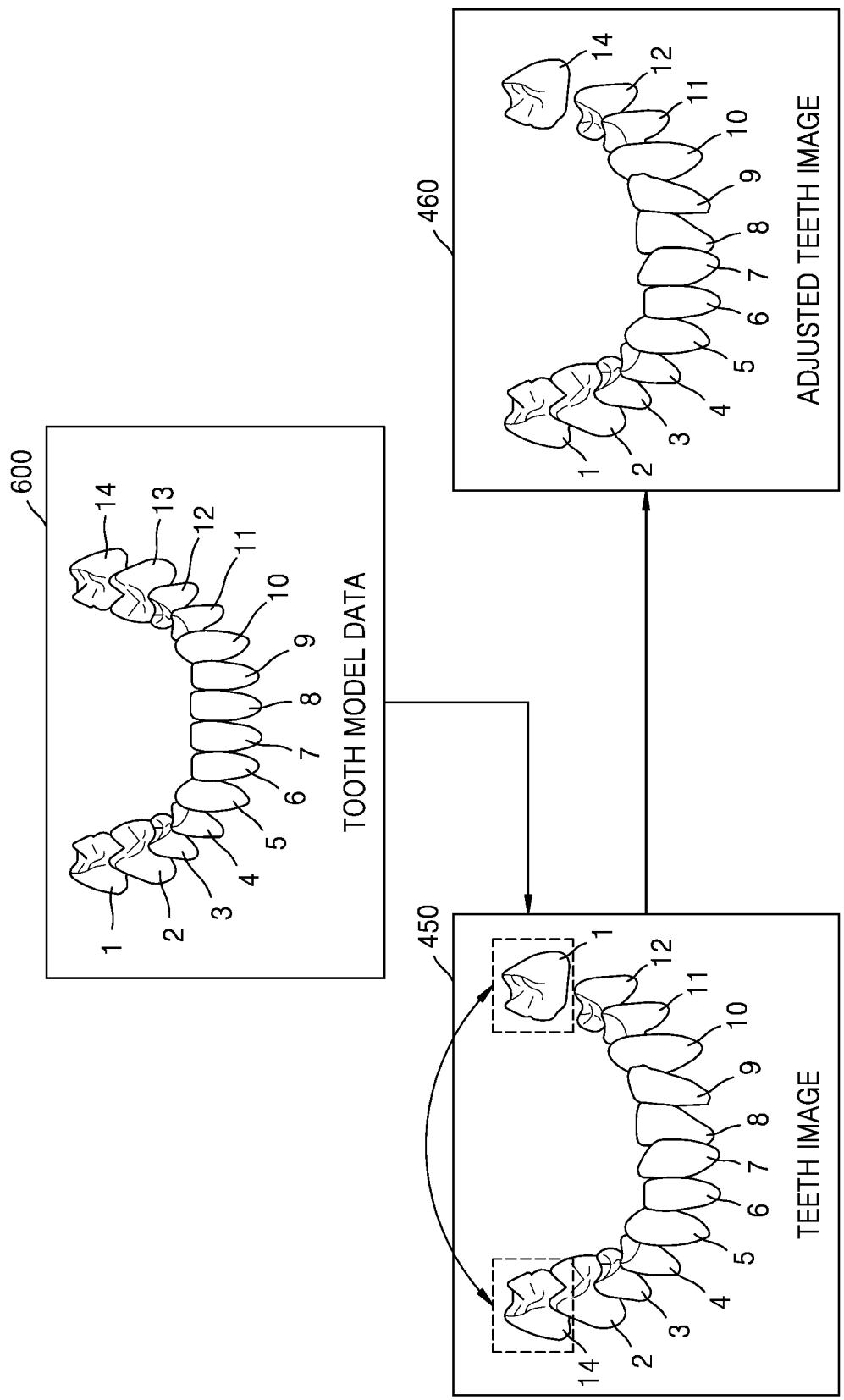
FIG. 10 is a reference diagram for describing a method of adjusting the tooth position of a teeth image by using tooth model data, according to an embodiment.

FIG. 10 is a reference diagram for describing a method of adjusting the tooth position of a teeth image by using tooth model data, according to an embodiment.

Referring to FIG. 10, the data processing apparatus 100 may determine whether it is necessary to adjust the teeth of the teeth image 450, by comparing the teeth image 450 obtained according to the method described with reference to FIG. 7 with the tooth model data 600. Particularly, the data processing apparatus 100 may determine whether there is an error in the tooth numbers, by comparing the tooth numbers of the teeth of the teeth image 450 with the tooth numbers of the teeth of the tooth model data 600.

In the tooth model data 600, the teeth may be respectively numbered with tooth numbers sequentially increasing by 1 from the left starting with tooth number #1, that is, tooth number #1 given to the leftmost tooth, tooth number #2 given to the next tooth, . . . , and tooth number #14 given to the rightmost tooth. In the teeth image 450 obtained by the data processing apparatus 100 through tooth replacement, tooth number #14 may be given to the leftmost tooth and tooth number #1 may be given to the rightmost tooth. Thus, the data processing apparatus 100 may identify that the tooth numbers of the teeth of the teeth image do not match the tooth numbers of the tooth area image of the first intraoral image.

The data processing apparatus 100 may identify the portions where the tooth numbers of the teeth of the teeth image do not match the tooth numbers of the tooth model data, and adjust the identified portions where the tooth numbers do not match the corresponding tooth numbers. For example, the data processing apparatus 100 may obtain an adjusted teeth image 460 by adjusting incorrect tooth positions by interchanging the tooth given tooth number #1 with the tooth given tooth number #14 in the teeth image.

Alternatively, in another embodiment, the data processing apparatus 100 may determine whether there is an error in the tooth positions, by automatically recognizing (AI) the tooth numbers of the teeth of the teeth image 450 obtained according to the method described with reference to FIG. 7.

In the dentist, an orthodontic treatment of the patient may be performed for a certain time period. For example, it may take about 6 months to about 2 years to complete the orthodontic treatment. Thus, after attaching the orthodontic device to the teeth, the patient may periodically visit the hospital to receive an orthodontic treatment or to identify a teeth movement state. Thus, whenever the patient visits the hospital, the data processing apparatus 100 may process an intraoral image according to a data processing method described herein.

Figure 11:
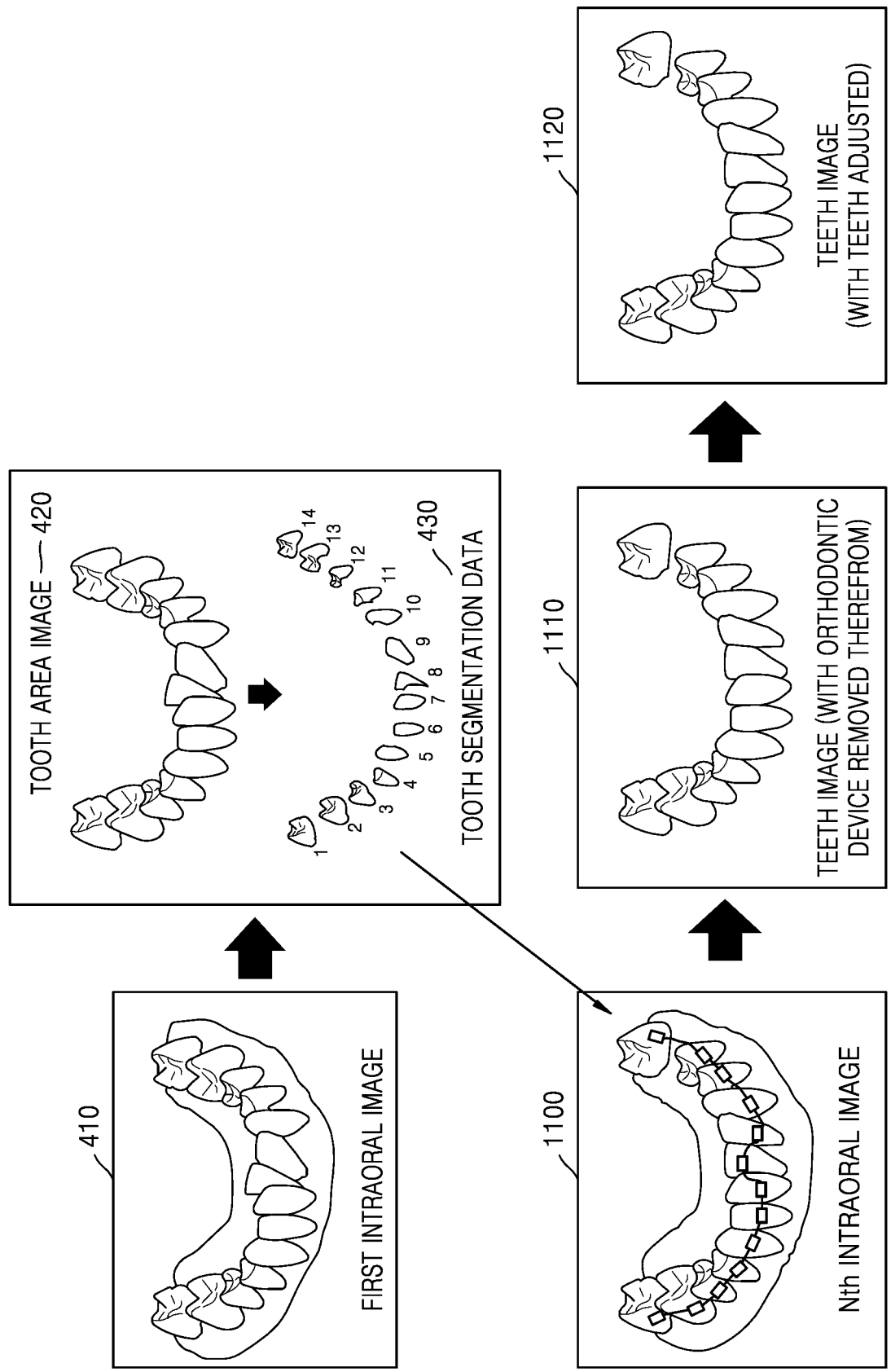
FIG. 11 is a reference diagram for describing a method of processing an Nth intraoral image, according to an embodiment.

FIG. 11 is a reference diagram for describing a method of processing an Nth intraoral image, according to an embodiment. The Nth intraoral image may represent data obtained by scanning the patient's oral cavity at an Nth time point during the orthodontic treatment.

Referring to FIG. 11, the first intraoral image 410 may be data obtained by scanning the user's oral cavity before the orthodontic device is attached to the user's teeth, and the tooth segmentation data 430 may be data obtained by segmenting the tooth area image 420 rerepresenting the tooth area separated from the first intraoral image 410 by using the tooth model data or the like, which are the same as those described in FIG. 4.

The data processing apparatus 100 may obtain an Nth intraoral image 1100 by scanning the oral cavity with the orthodontic device attached to the user's teeth at the Nth time point after the obtaining of the first intraoral image. In order to remove the orthodontic device attached to the teeth in the Nth intraoral image, the data processing apparatus 100 may process the Nth intraoral image by using the first intraoral image as described with reference to FIG. 4.

Particularly, in order to remove the orthodontic device attached to the teeth in the Nth intraoral image, the data processing apparatus may use the tooth segmentation data 430 obtained from the first intraoral image. That is, the data processing apparatus 100 may find tooth segmentation data having a shape similar to the shape of each tooth included in the Nth intraoral image and substitute the found tooth segmentation data for the corresponding tooth position of the Nth intraoral image, thereby replacing the teeth with the orthodontic device attached thereto in the Nth intraoral image by the teeth with the orthodontic device removed therefrom. A teeth image 1110 with the orthodontic device removed therefrom may be obtained by searching the tooth segmentation data for teeth respectively having similar shapes to all the teeth of the Nth intraoral image and then arranging similar tooth segmentation data at the corresponding positions of the Nth intraoral image. As such, by obtaining the teeth image 1110 with the orthodontic device removed therefrom, an image of a tooth arrangement state with the orthodontic device removed from the intraoral image obtained by scanning the oral cavity with the orthodontic device attached thereto may be provided to the patient as the user. Then, when an incorrect tooth number is identified in the teeth image 1110 with the orthodontic device removed therefrom, the data processing apparatus 100 may obtain an adjusted teeth image 1120 by adjusting the teeth of the teeth image by changing and arranging the positions of the teeth such that the tooth numbers may be corrected or adjusted.

Figure 12:
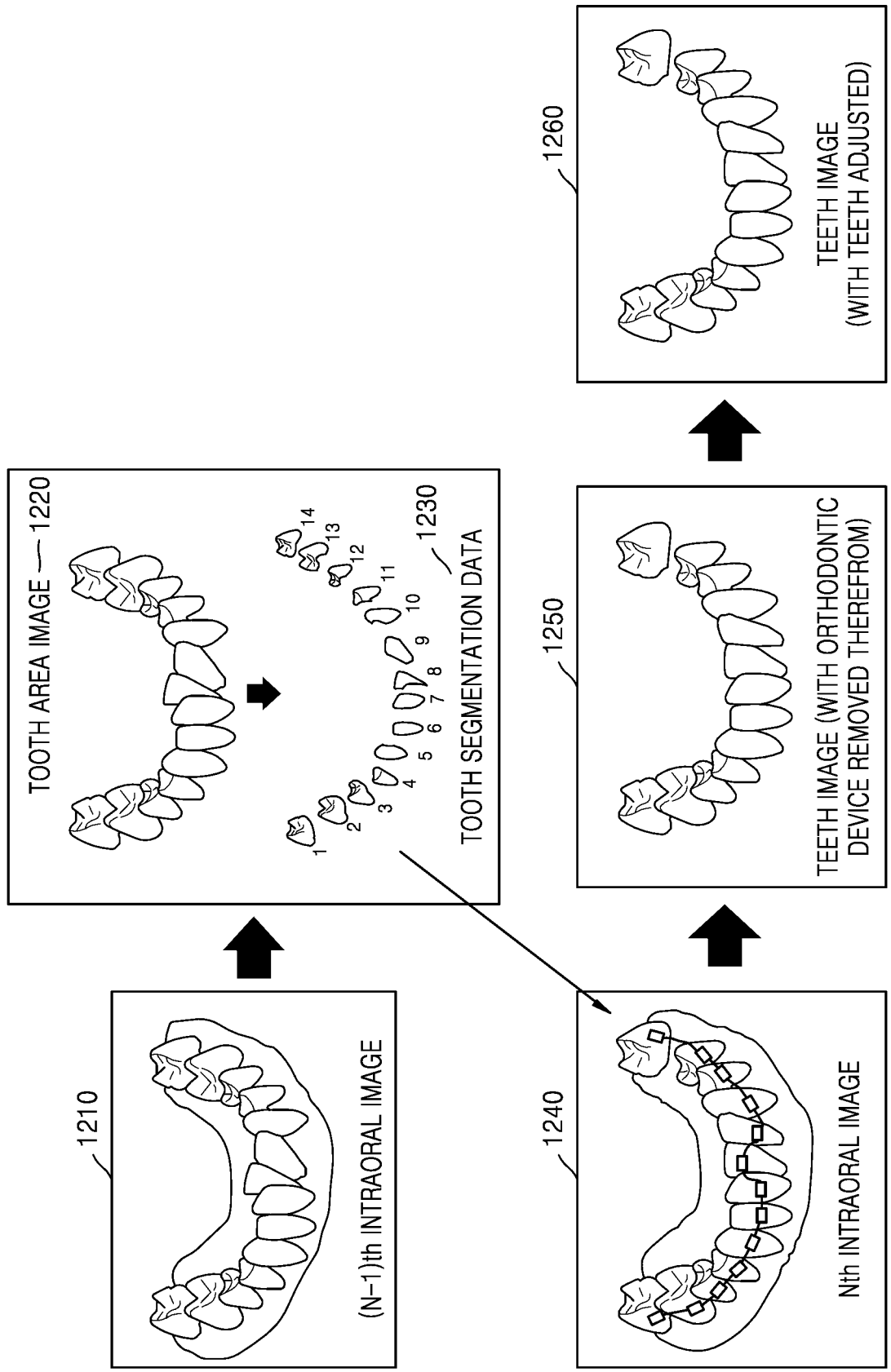
FIG. 12 is a reference diagram for describing another example of a method of processing an Nth intraoral image, according to an embodiment.

FIG. 12 is a reference diagram for describing another example of a method of processing an Nth intraoral image, according to an embodiment. Unlike in FIG. 11 where the first intraoral image is used, in FIG. 12, an intraoral image at a time point (N−1)th time point immediately before the Nth time point may be used to process the Nth intraoral image.

Referring to FIG. 12, an (N−1)th intraoral image 1210 may represent data obtained by scanning the user's oral cavity with the orthodontic device attached thereto at the (N−1)th time point immediately before the Nth time point. When the (N−1)th intraoral image 1210 is processed at the (N−1)th time point, an (N−2)th intraoral image at an (N−2)th time point may be used to obtain an image with the orthodontic device removed therefrom and in this case, the data processing apparatus 100 may obtain tooth segmentation data of the (N−1)th intraoral image. That is, because the teeth of the (N−1)th intraoral image are replaced with the teeth of the (N−2)th intraoral image, a tooth area image 1220 and tooth segmentation data 1230 corresponding to each of the teeth of the (N−1)th intraoral image may be obtained when the orthodontic device is removed from the (N−1)th intraoral image.

The data processing apparatus 100 may obtain an Nth intraoral image 1240 by scanning the user's oral cavity at the Nth time point after the obtaining of the (N−1)th intraoral image. In order to remove the orthodontic device attached to the teeth in the Nth intraoral image, the data processing apparatus 100 may process the Nth intraoral image by using the (N−1)th intraoral image as described with reference to FIG. 4.

Particularly, in order to remove the orthodontic device attached to the teeth in the Nth intraoral image, the data processing apparatus 100 may use the tooth segmentation data obtained from the (N−1)th intraoral image. That is, the data processing apparatus 100 may find tooth segmentation data having a shape similar to the shape of each tooth included in the Nth intraoral image and substitute the found tooth segmentation data for the corresponding tooth position of the Nth intraoral image, thereby replacing the teeth with the orthodontic device attached thereto in the Nth intraoral image by the teeth with the orthodontic device removed therefrom. A teeth image 1250 with the orthodontic device removed therefrom may be obtained by searching the tooth segmentation data 1230 for teeth respectively having similar shapes to all the teeth of the Nth intraoral image and then arranging similar tooth segmentation data at the corresponding positions of the Nth intraoral image. As such, by obtaining the teeth image with the orthodontic device removed therefrom, an image of a tooth arrangement state with the orthodontic device removed from the intraoral image obtained by scanning the oral cavity with the orthodontic device attached thereto may be provided to the patient as the user. Thereafter, when an incorrect tooth number is identified in the teeth image with the orthodontic device removed therefrom, the data processing apparatus 100 may obtain an adjusted teeth image 1260 by adjusting the teeth of the Nth intraoral image by changing and arranging the positions of the teeth such that the tooth numbers may be corrected.

Figure 13:
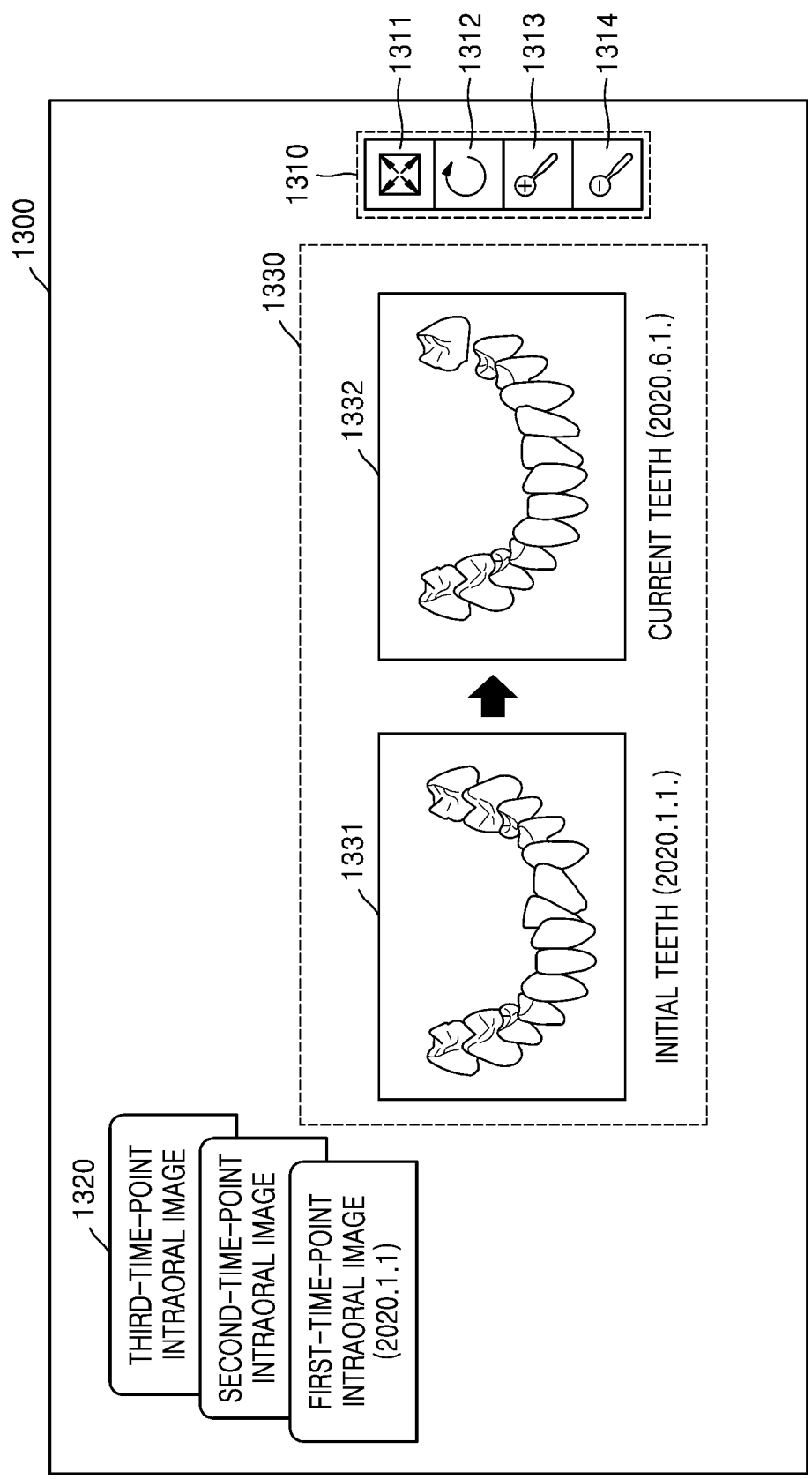
FIG. 13 illustrates an example of a user interface displaying a movement state of the user's corrected teeth, according to an embodiment.

FIG. 13 illustrates an example of a user interface displaying a movement state of the patient's corrected teeth, according to an embodiment.

The data processing apparatus 100 may generate a user interface screen 1300 including the intraoral image and visually output the same through a display. Here, the user interface screen 1300 may include one or more menu bars for allowing the user (e.g., the dentist) to use data obtained by scanning the teeth by using the intraoral scanner.

The user interface screen 1300 may include a menu bar 1310 including at least one menu for editing or changing the obtained intraoral image. For example, the menu bar 1310 may include menus including a full-screen view menu 1311, a previous image view menu 1312, an intraoral image expansion menu 1313, and an intraoral image reduction menu 1314.

The user interface screen 1300 may include a menu 1320 for displaying intraoral images of the patient undergoing an orthodontic treatment at various time points. The menu 1320 may include a first-time-point intraoral image item, a second-time-point intraoral image item, and a third-time-point intraoral image item. The user operating the data processing apparatus 100 may select one or more items included in the menu 1320 through a user interface or the like such that an image corresponding to the selected item may be displayed in a window 1330.

For example, when the user selects a first-time-point intraoral image representing the initial teeth scanned on Jan. 1, 2020 and a third-time-point intraoral image representing the teeth scanned 6 months later, the data processing apparatus 100 may display the first-time-point intraoral image and the third-time-point intraoral image side by side in the window 1330 such that the user may identify how much the teeth have moved due to the orthodontic treatment. The orthodontic device is attached to the patient's teeth after the orthodontic treatment is started; however, because an intraoral image with the orthodontic device removed therefrom may be obtained according to the method described herein even when the oral cavity is scanned with the orthodontic device attached thereto without physically removing the orthodontic device from the patient's teeth, the data processing apparatus 100 may display an image with the orthodontic device removed from the teeth, such as a teeth image 1332 displayed on the user interface screen of FIG. 13, together with an initial teeth image 1331.

According to an embodiment, the data processing apparatus 100 may display, on the user interface screen 1300, teeth images at more time points as well as teeth images at two time points.

According to an embodiment, the data processing apparatus 100 may display, in the window 1330, one or more images selected by the user from among various intraoral images displayed in the menu 1320.

Figure 14:
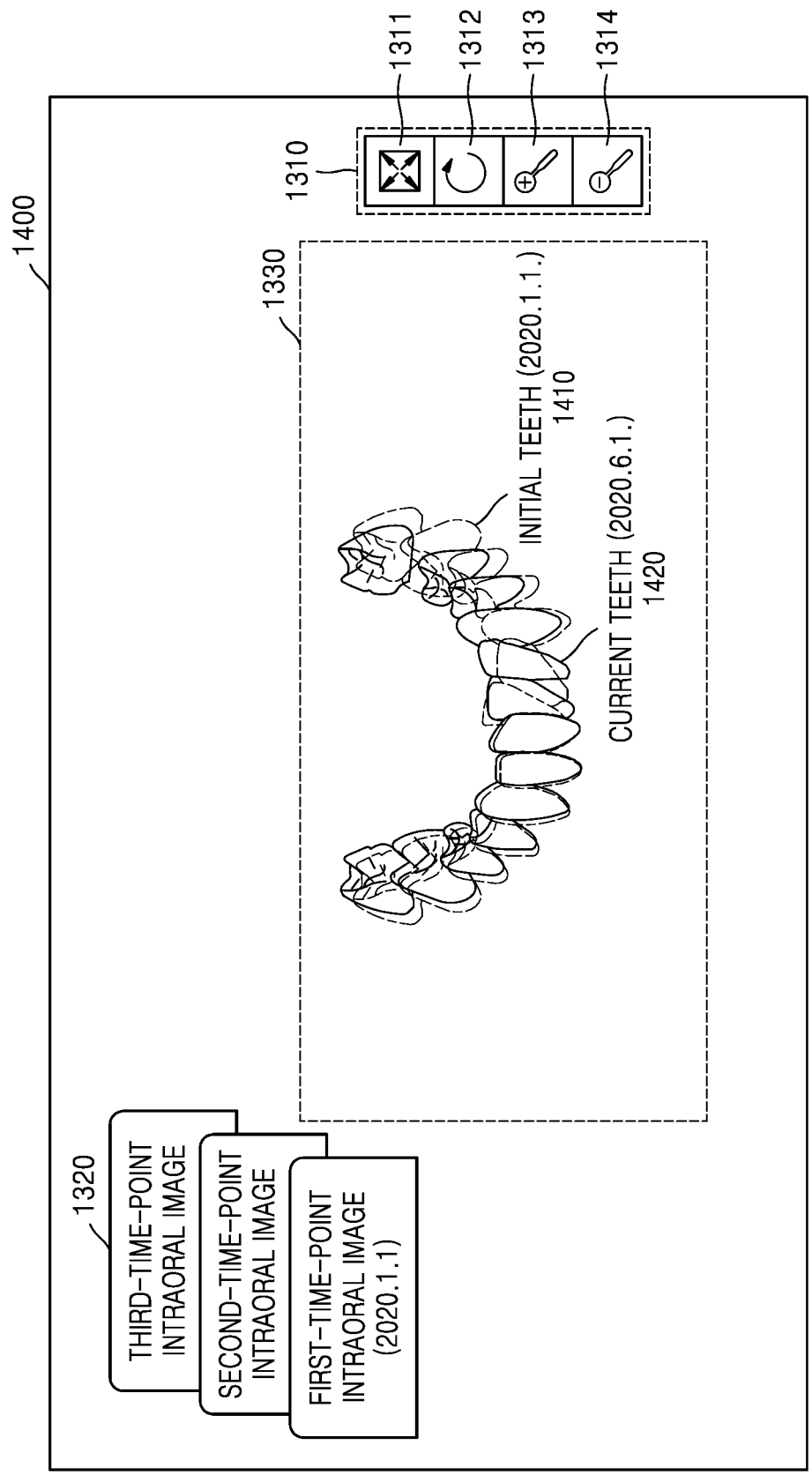
FIG. 14 illustrates another example of a user interface displaying a movement state of the user's corrected teeth, according to an embodiment.

FIG. 14 illustrates another example of a user interface displaying a movement state of the user's corrected teeth, according to an embodiment.

In the example illustrated in FIG. 13, the data processing apparatus 100 displays intraoral images at different time points selected by the user in parallel side by side; however, in the example illustrated in FIG. 14, intraoral images at different time points may be displayed in an overlay manner in order to more easily show the tooth movement between the intraoral images at different time points.

Referring to FIG. 14, the data processing apparatus 100 may display a third-time-point intraoral image 1420 representing a current tooth state on a first-time-point intraoral image 1410 representing an initial tooth state in an overlay manner such that the user may more easily identify the position change of each of the teeth.

The intraoral image processing method according to an embodiment of the present disclosure may be embodied in the form of program commands executable through various computer means, which may be recorded on a computer-readable recording medium. Also, embodiments of the present disclosure may include a computer-readable storage medium having recorded therein one or more programs including at least one instruction for executing the intraoral image processing method.

The computer-readable storage medium may include program commands, data files, and data structures either alone or in combination. Examples of the computer-readable storage medium may include magnetic media such as hard disks, floppy disks, or magnetic tapes, optical media such as CD-ROMs or DVDs, and magneto-optical media such as floptical disks, and hardware devices such ROMs, RAMs, or flash memories configured to store and execute program commands.

Here, a machine-readable storage medium may be provided in the form of a non-transitory storage medium. Here, the "non-transitory storage medium" may mean that the storage medium is a tangible device. Also, the "non-transitory storage medium" may include a buffer in which data is temporarily stored.

The intraoral image processing method according to various embodiments of the present disclosure may be included and provided in a computer program product. The computer program product may be distributed in the form of a machine-readable storage medium (e.g., a compact disc read only memory (CD-ROM)). Alternatively, the computer program product may be distributed (e.g., downloaded or uploaded) online through an application store (e.g., Play Store) or directly between two user devices (e.g., smartphones). Particularly, the computer program product according to embodiments may include a storage medium having recorded therein a program including at least one instruction to perform the intraoral image processing method according to embodiments.

Although embodiments have been described above in detail, the scope of the present disclosure is not limited thereto and various modifications and improvements made by those of ordinary skill in the art by using the basic concept of the present disclosure defined in the following claims are also included in the scope of the present disclosure.

The invention claimed is:

1. A method for processing intraoral image, the method comprising:
obtaining a first intraoral image generated by scanning teeth to which an orthodontic device is not attached and a current intraoral image generated by scanning the teeth to which the orthodontic device is attached;
segmenting teeth of the first intraoral image;

obtaining a current teeth image with the orthodontic device removed therefrom by replacing the teeth with the orthodontic device in the current intraoral image with the teeth segmented from the first intraoral image; and adjusting teeth of the current teeth image by using tooth numbers, wherein the adjusting the teeth in the current teeth image comprises:

identifying, by comparing the tooth numbers of a specified intraoral image with the tooth numbers of the current teeth image, teeth in the current teeth image whose tooth numbers do not match tooth numbers of the specified intraoral image, and adjusting the positions of the identified teeth in the current teeth image such that the tooth numbers of the identified teeth match the tooth numbers of the specified intraoral image with reference to the tooth numbers of the specified intraoral image.

2. The method of claim 1, wherein the specified intraoral image includes the first intraoral image, and the adjusting of the teeth of the current teeth image comprises:

identifying, by comparing tooth numbers of the first intraoral image with tooth numbers of the current teeth image, teeth of the current teeth image whose tooth numbers do not match the tooth numbers of the first intraoral image; and adjusting the positions of the identified teeth in the current teeth image that do not match the tooth numbers of the first intraoral image by swapping the positions of a first tooth and a second tooth identified as not matching, such that the tooth numbers of the current teeth image match the tooth numbers of the first intraoral image.

3. The method of claim 2, wherein the tooth numbers of the first intraoral image are obtained based on tooth model data in which tooth numbers are assigned, and the tooth numbers of the current teeth image are obtained by replacing the teeth with the orthodontic device the current intraoral image with the segmented teeth of the first intraoral image.

4. The method of claim 1, wherein the specified intraoral image includes tooth model data in which tooth numbers are assigned, and the adjusting of the identified teeth of the current teeth image comprises:

identifying teeth in the current teeth image whose tooth numbers do not match the tooth numbers of the tooth model data, by comparing the tooth numbers of the tooth model data with the tooth numbers of the current teeth image; and adjusting the positions of the identified teeth of the current teeth image such that the tooth numbers of the current teeth image match the tooth numbers of the tooth model data.

5. The method of claim 1, wherein the obtaining of the current teeth image with the orthodontic device removed therefrom is performed by comparing shapes of the teeth with the orthodontic device in the current intraoral image with the segmented teeth of the first intraoral image.

6. An apparatus for processing intraoral image, the apparatus comprising:

a memory; and a processor, wherein the processor is configured to execute one or more instructions stored in the memory to:

obtain a first intraoral image generated by scanning teeth to which an orthodontic device is not attached and a current intraoral image generated by scanning the teeth to which the orthodontic device is attached;

segment teeth of the first intraoral image;

obtain a current teeth image with the orthodontic device removed therefrom by replacing the teeth with the orthodontic device in the current intraoral image with the teeth segmented from the first intraoral image; and adjust teeth of the current teeth image by using tooth numbers, by:

identifying, by comparing the tooth numbers in a specified intraoral image with the tooth numbers of the current teeth image, teeth in the current teeth image whose tooth numbers do not match the tooth numbers of the specified intraoral image, and adjusting the positions of the identified teeth in the current teeth image such that the tooth numbers of the identified teeth match the tooth numbers of the specified intraoral image with reference to the tooth numbers of the specified intraoral image.

7. The intraoral image processing apparatus of claim 6, wherein the specified intraoral image includes the first intraoral, and in order to adjust the teeth of the current teeth image, the processor is further configured to execute the one or more instructions stored in the memory to:

identify, by comparing the tooth numbers of the first intraoral image with tooth numbers of the current teeth image, teeth of the current teeth image whose tooth numbers do not match the tooth numbers of the first intraoral image; and adjust the positions of the identified teeth in the current teeth image whose tooth numbers do not match the tooth numbers of the first intraoral image by swapping the positions of a first tooth and a second tooth identified as not matching, such that the tooth numbers of the current teeth image match the tooth numbers of the first intraoral image.

8. The apparatus of claim 7, wherein the tooth numbers of the first intraoral image are obtained based on tooth model data in which tooth numbers are assigned, and the tooth numbers of the current teeth image are obtained by replacing the teeth with the orthodontic device in the current intraoral image with the segmented teeth of the first intraoral image.

9. The apparatus of claim 6, wherein the specified intraoral image includes tooth model data in which tooth numbers are assigned, and in order to adjust the teeth of the current teeth image, the processor is further configured to execute the one or more instructions stored in the memory to:

identify teeth in the current teeth image whose tooth numbers do not match the tooth numbers of the tooth model data, by comparing the tooth numbers of the tooth model data with the tooth numbers of the current teeth image; and adjust the positions of the identified teeth of the current teeth image such that the tooth numbers of the identified teeth match the tooth numbers of the tooth model data.

10. A non-transitory computer-readable storage medium having recorded therein a program including at least one instruction to perform an intraoral image processing method, the intraoral image processing method comprising:

obtaining a first intraoral image generated by scanning teeth to which an orthodontic device is not attached and a current intraoral image generated by scanning the teeth to which the orthodontic device is attached;

segmenting teeth of the first intraoral image;

obtaining a current teeth image with the orthodontic device removed therefrom by replacing the teeth with the orthodontic device in the current intraoral image with the teeth segmented from the first intraoral image; and adjusting teeth of the current teeth image by using tooth numbers, wherein the adjusting the teeth in the current teeth image comprises:

identifying, by comparing the tooth numbers of a specified intraoral image with the tooth numbers of the current teeth image, teeth in the current teeth image whose tooth numbers do not match tooth numbers of the specified intraoral image, and adjusting the positions of the identified teeth in the current teeth image such that the tooth numbers of the identified teeth match the tooth numbers of the specified intraoral image with reference to the tooth numbers of the specified intraoral image.

\* \* \* \* \*